E. E. PAGE.
Air Cooling and Purifying Apparatus.

No. 158,599. Patented Jan. 12, 1875.

UNITED STATES PATENT OFFICE.

E. EMERSON PAGE, OF BOSTON, MASSACHUSETTS.

IMPROVEMENT IN AIR COOLING AND PURIFYING APPARATUS.

Specification forming part of Letters Patent No. 158,599, dated January 12, 1875; application filed December 7, 1874.

*To all whom it may concern:*

Be it known that I, E. EMERSON PAGE, of Boston, State of Massachusetts, have invented an Improved Cooling and Air-Purifying Apparatus, of which the following is a specification:

My invention relates to a tank for containing ice, and parts connected therewith, to cause a circulation of air, the whole arranged in conjunction with a preserving-chamber or room to be cooled, and the air therein purified; and it consists in the construction for causing the warmer air in said chamber or room to pass up into said tank and around the ice contained therein, and having been, by contact with the ice, cooled and relieved of impurities, to pass away with the water of the melted ice, to pass down and about the chamber.

Figure 1:
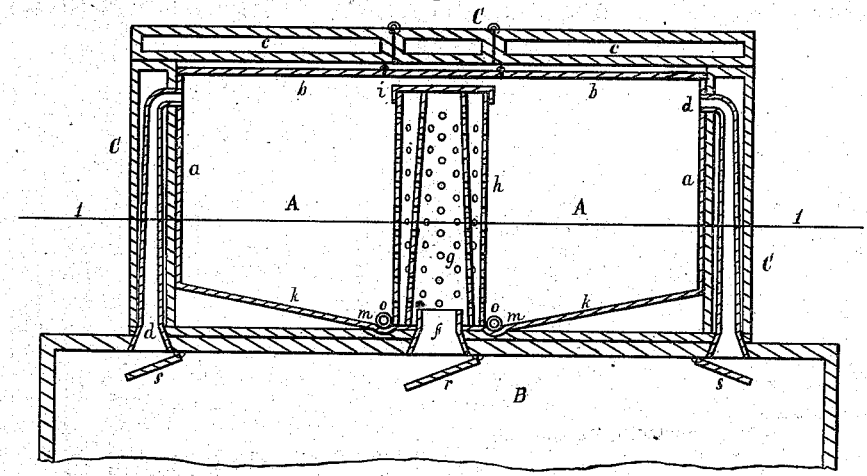
Figure 2:
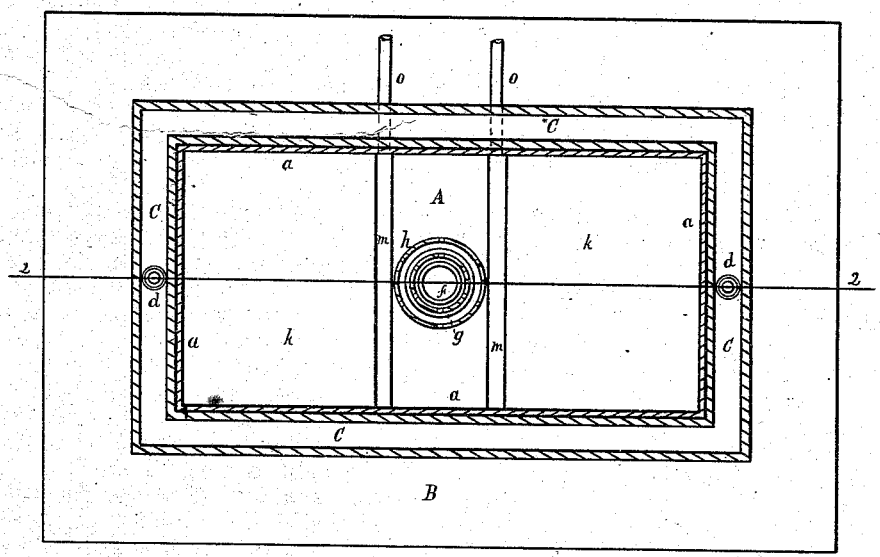

Figure 1 illustrates my invention, being a vertical longitudinal section, taken on the line shown at 2 2 in Fig. 2. Fig. 2 is a horizontal section of tank and parts connected therewith, taken on the line 1 1 of Fig. 1.

I find it best to locate the tank A on the top, and central therewith, of the preserving-chamber, or room to be cooled and purified, B. Only the upper part of the chamber B is shown in the drawing. The tank A has a metallic or other suitable lining, *a*, and casing and packing C about the sides. There are suitable lids, as *b b*, for the metallic part, and *c c* for the outer casing, arranged and hinged, as shown. Vertical tubes *d d*, separated from the air in and also about the tank by the packing and casing, open at their lower ends into the upper part of the chamber B, and at the upper ends into the upper part of the tank, passing through the sides thereof. Only two of such tubes are shown, and these are thought sufficient in most cases. It is found best to have these tubes taper upward and have widely-flaring openings into the chamber, as shown. A short, *f*, extends from the upper part of the chamber B into the center of the tank A, and a short distance above the bottom of the tank. There extends from the bottom of the tank, and outside of the tube *f*, a vertical perforated tube, *g*, nearly to the top of the tank. The tube *g* tapers upward. About the tube *g* is another vertical, perforated, but larger and straight, tube, *h*, extending from the bottom to near the top of the tank. There may be, if required, more than one set of tubes *f g h*. Over the top of the perforated tubes *g* and *h* is placed the tight cap *i*, which extends some distance down the tube *h*. The bottom *k* of the tank is inclined on either side toward the center of the tank, having the gutters *m m* connected with the drain-pipes *o o*.

The parts of the apparatus being arranged as described and shown, ice having been placed on the inclined bottom, the warmer air of the chamber B will pass up the tubes *d d*, and into the upper part of the tank A, and being thus brought in contact with the ice will be cooled and fall down the tank and about the ice, and will finally pass through the perforations of the tubes *g* and *h*, and down the tube *f*, into and even to the bottom of the chamber B. The tubes *g* and *h*, having many perforations, the air will pass in close contact with the sides of tubes, and also be caused to circulate within the annular space between the tubes, and, consequently, will part with as much as possible of its moisture, which will collect on and fall down the sides of the tubes. The impurities in the air will mingle with the water of the melting ice, and pass away with it along the inclined bottom *k*, gutters *m m*, and drain-pipes *o o*, which have outlets outside of the chamber and tank. The ice placed on the inclined bottom will, as it melts, slide toward the center of the tank, keeping about the tube *h*, so that the air will be brought in close contact it. Valves *s s r* are so arranged that the passage of the air from and to the chamber may be regulated.

By my arrangement, especially of the perforated tubes *g* and *h*, the air is brought into the closest contact with the ice, and when the ice has been broken up, but not too finely, before being put into the tank, the air is caused to pass through the mass.

My invention will be found very efficient for preserving meats, vegetables, butter, eggs, &c., since they not only will be kept cool, but all impurities in the air about them will be removed. It will also be found very effective and convenient for cooling and purifying parlors, sleeping-rooms, &c.

I claim as my invention—

1. The combination of the perforated tubes $g$ and $h$ with the tank A, substantially as and for the purpose hereinbefore set forth.

2. The combination of the tubes $d\ d$ with the tank A, chamber B, and perforated tubes $g$ and $h$, substantially as hereinbefore described.

3. The combination of the valves $s\ s\ r$, tubes $f$ and $d\ d$, tank A, and chamber B, all arranged as and for the purpose hereinbefore set forth.

E. EMERSON PAGE.

Witnesses:
 JOHN C. COOK, Jr.,
 EDW. DUMMER.